Dec. 29, 1931.    G. TRICAN    1,838,970
PARACHUTE
Filed Nov. 27, 1929    2 Sheets-Sheet 1

Dec. 29, 1931.   G. TRICAN   1,838,970
PARACHUTE
Filed Nov. 27, 1929   2 Sheets-Sheet 2
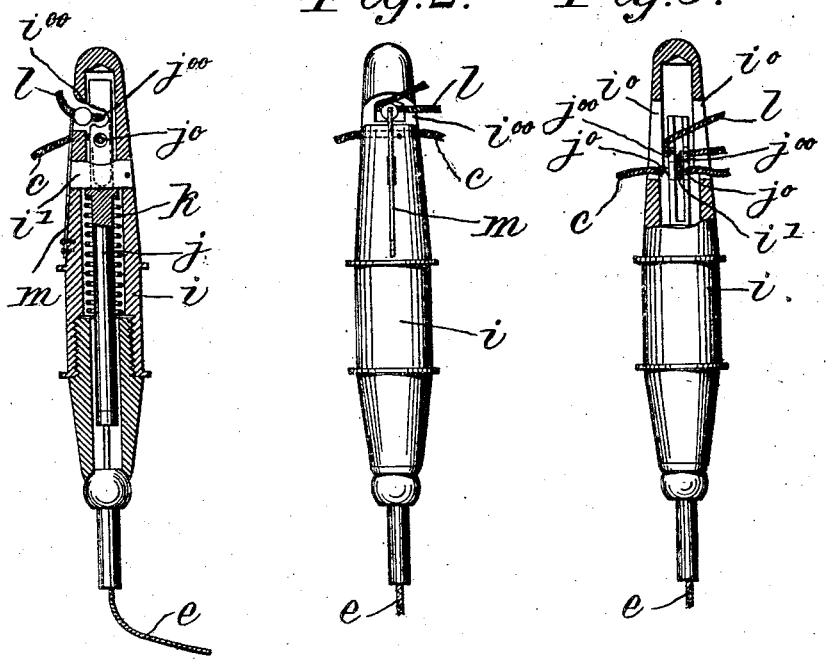
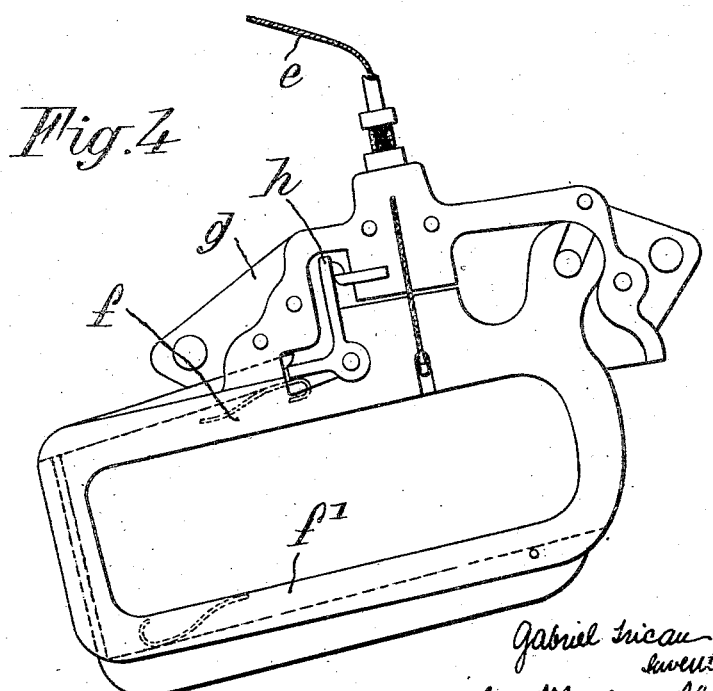

Patented Dec. 29, 1931

1,838,970

UNITED STATES PATENT OFFICE

GABRIEL TRICAN, OF ISSY-LES-MOULINEAUX, FRANCE

PARACHUTE

Application filed November 27, 1929, Serial No. 410,030, and in Belgium December 3, 1928.

The present invention relates to parachutes and, more particularly, to mechanism operative to assure proper opening thereof in use.

One of the objects of the invention is to provide a double opening mechanism comprising an automatic parachute release and a hand operated release adapted to be operated in the event that the automatic release does not function.

Another object is to provide a double releasing mechanism of the type above mentioned in combination with means operative to temporarily support the top of the parachute and so assure its proper opening.

Further objects will appear in the course of the detailed description now to be given in connection with the accompanying drawings, in which:—

Fig. 2 is an elevation of part of the hand operated means for releasing the parachute;

Fig. 3 shows the same hand-operated mechanism partially in section;

Fig. 4 is an elevation of the complete hand-operated mechanism, with the portion thereof represented in Figs. 2 and 3 shown in longitudinal section.

Figure 1:
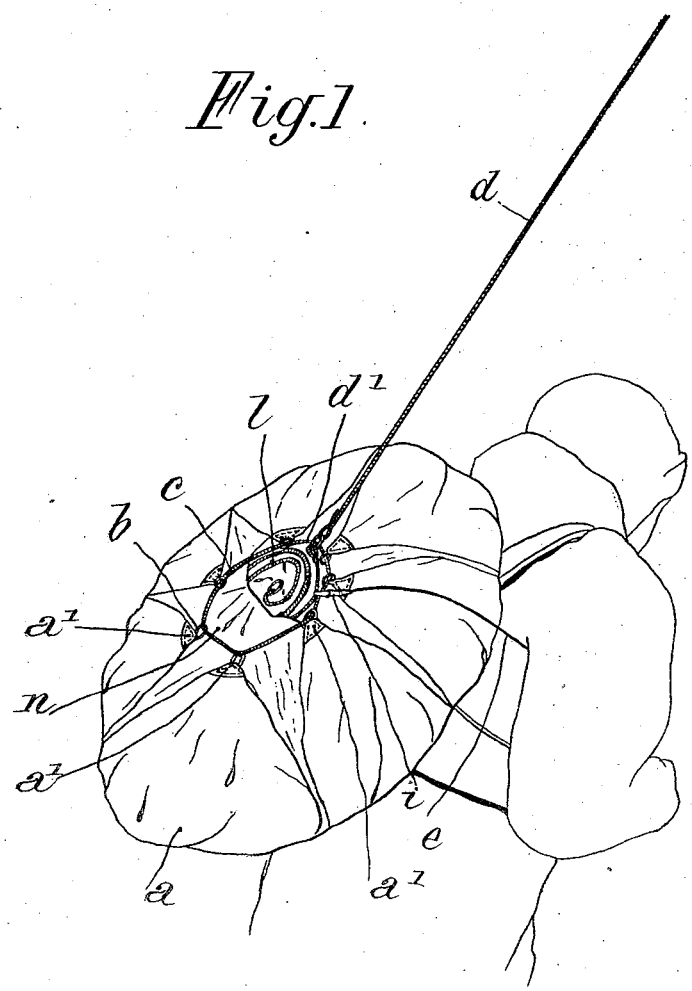
Fig. 1 represents, in perspective, a parachute and its opening mechanism prior to release.

Referring to the various figures of the drawings, there is shown a parachute envelope $a$ provided with peripheral tabs $a^1$ carrying rings $b$,—a cord $c$ passing through rings $b$ and maintaining the parachute in closed position,—a cable $d$ carrying a ring $d^1$ at one extremity attached to cord $c$ and having its other extremity firmly attached to a balloon, aeroplane or other aeronautical vessel or machine (not shown),—a hand operated assembly for cutting cord $c$ comprising a frame $f$ provided with a handle $f^1$, a Bowden wire $e$ anchored in frame $f$ as shown in Fig. 4, a support $g$ adapted to be attached permanently to the parachutist's belt and detachably engaging with frame $f$, a trigger assembly for releasing frame $f$ from support $g$ consisting of a trigger $h$ moving against the action of a spring $h^1$ and engaging at $h^2$ with one arm of a pivoted catch $h^3$ bearing against a spring $h^4$, a tubular casing $i$ receiving the distal end of Bowden $e$ and having openings $i^0$ formed in the walls thereof, a knife $i^1$ rigidly mounted in casing $i$, a rod $j$ having one extremity connected to wire $e$ and having a split distal extremity traversed by transverse aligned holes $j^0$, and spring $k$ resisting downward movement of rod $j$,—and means for temporarily supporting the top of the parachute so as to assure its proper opening consisting of a cord $l$ anchored at one end to the top of the parachute and having its other end attached to ring $d^1$, and means associated with tubular casing $i$ for cutting cord $l$ composed of a spring $m$ positioned on the outside of casing $i$ and terminating in a spherical element $m^1$ adapted to resiliently maintain part of cord $l$ in position in opening $i^{00}$ (formed through the wall of casing $i$) in contact with a lateral groove $j^{00}$ formed adjacent the free extremity of rod $j$.

The hereinabove described assembly operates as follows:

Assuming that the various operating elements are, in the position shown in Figs. 1, 2 and 4, i. e. cord $c$ passing transversely through openings $j^0$ and cord $l$ engaging in lateral groove $j^{00}$, and that the parachutist, without touching the cutting or releasing mechanism, jumps into space, parachute $a$ will move downward until cable $d$ is extended to a maximum; ring $d^1$ will then snap cord $c$; the parachute will open, cord $l$ attached to ring $d^1$ snapping out from under $m$, $m^1$ and supporting the top of the parachute so as to assure proper orientation of the latter; cord $b$ in turn parts under the weight of the parachutist, and the parachute moves downward until it reaches the ground. But let it be supposed that cord $c$ does not snap under the pull exerted by cable $d$, or that by accident, inadvertence, or mistake, cable $d$ is not attached to the balloon or aeroplane, or that said cable is entirely omitted, or again that the balloon or aeroplane is dropping at the same or a faster rate than the parachutist, it then becomes necessary to operate the assembly attached to the parachutist's belt to cut cord $c$ and in the following manner: The parachutist presses trigger $h$, liberating frame $f$ from fixed support $g$, and exerts a downward (and lateral) pull on cable $e$; rod $j$, moving against the action of spring $k$, thereupon brings cords $c$ and $l$ successively down onto knife $i^1$ and severs both; the parachute then opens as already described and descends to the ground.

Cord $l$ should be sufficiently strong to perform its parachute supporting function but still snap under the added pull of the parachutist's weight. Obviously, this cord and the structures for effecting its cutting may be omitted, if desired, without affecting the operativeness of the rest of the assembly.

What I claim is:—

1. In a parachute assembly, a parachute, a cord for maintaining said parachute in collapsed position, a suspending cable attached to said cord and operative to rupture the latter when a sufficient pull is exerted thereon, a cord attached at opposite extremities to the suspending cable and to the top of the parachute, and means operative to section each of the aforesaid cords.

2. In a parachute assembly, a parachute, a cord for maintaining said parachute in collapsed position, a suspending cable attached to said cord and operative to rupture the latter when subjected to a sufficient pull, a cord attached at opposite extremities to said cable and the top of the parachute,—and means for cutting each of the aforesaid cords comprising gripping means adapted to take hold of each of said cords, a knife, and means for moving said gripping means and knife towards one another.

3. In a parachute assembly, a parachute, a cord for maintaining said parachute in collapsed position, a suspending cable attached to said cord and operative to rupture the latter when subjected to a sufficient pull, a cord attached at opposite extremities to said cable and to the top of the parachute,—and a holding element including means for releasably maintaining said last named cord in position, and means operative to section one of said cords.

In testimony whereof I affix my signature.

GABRIEL TRICAN.